US012647775B2

(12) United States Patent
Kim

(10) Patent No.: US 12,647,775 B2
(45) Date of Patent: Jun. 2, 2026

(54) METHOD AND APPARATUS FOR REPORTING IN-DEVICE COEXISTENCE INFORMATION IN WIRELESS MOBILE COMMUNICATION SYSTEM

(71) Applicants: BLACKPIN INC., Seoul (KR);
Soenghun Kim, Gyeonggi-do (KR)

(72) Inventor: Soenghun Kim, Gyeonggi-do (KR)

(73) Assignees: BLACKPIN INC., Seoul (KR);
Seonghun Kim, Gyeonggi-do (KR)

( * ) Notice: Subject to any disclaimer, the term of this patent is extended or adjusted under 35 U.S.C. 154(b) by 80 days.

(21) Appl. No.: 18/140,625

(22) Filed: Apr. 28, 2023

(65) Prior Publication Data

US 2023/0379693 A1 Nov. 23, 2023

(30) Foreign Application Priority Data

May 20, 2022 (KR) ........................ 10-2022-0061930

(51) Int. Cl.
*H04W 16/14* (2009.01)
*H04W 8/24* (2009.01)
*H04W 76/27* (2018.01)

(52) U.S. Cl.
CPC ............. *H04W 8/24* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2018/0263048 A1* | 9/2018 | Ingale | H04W 16/14 |
| 2020/0169944 A1* | 5/2020 | Sharma | H04W 24/02 |
| 2023/0189009 A1* | 6/2023 | Bansal | H04W 76/20 |
| | | | 370/329 |

FOREIGN PATENT DOCUMENTS

| | | |
|---|---|---|
| KR | 10-2013-0104333 A | 9/2013 |
| KR | 10-2020-0031176 | 3/2020 |

(Continued)

OTHER PUBLICATIONS

Ericsson, "Miscellaneous non-controversial corrections Set X", R2-2105939, 3GPP TSG-RAN WG2 Meeting #114-e Electronic Meeting, May 19-27, 2021, 931 pages.

(Continued)

*Primary Examiner* — Gary Lafontant
(74) *Attorney, Agent, or Firm* — Nicholas Park

(57) ABSTRACT

A method for in-device coexistence information reporting is provided. The method includes receiving from a base station a first Radio Resource Control (RRC) message, transmitting a second RRC message, the second RRC message includes an in-device coexistence information, receiving a third RRC message, and applying a configuration based on the third RRC message. A first in-device coexistence information is included in the second RRC message if the first RRC message includes a first information, the first in-device coexistence information includes information related to frequency domain, the first information configures the terminal to report in-device coexistence information related to frequency domain. A second in-device coexistence information is included in the second RRC message if the first RRC message includes a second information, the second in-device coexistence information includes information related to time pattern, the second information configures the terminal to report in-device coexistence information related to time pattern.

3 Claims, 9 Drawing Sheets

(56)                    References Cited

FOREIGN PATENT DOCUMENTS

| | | | |
|---|---|---|---|
| KR | 10-2020-0031176 | A | 3/2020 |
| KR | 10-2021-0042345 | | 4/2021 |
| KR | 10-2021-0042345 | A | 4/2021 |
| KR | 10-2021-0098129 | | 8/2021 |
| KR | 10-2021-0098129 | A | 8/2021 |
| KR | 10-2013-0104333 | | 9/2023 |

OTHER PUBLICATIONS

Korean Notice of Allowance, Korean Appln No. 10-2022-0061930, mailed on Feb. 27, 2024, 4 pages (with English Translation).
Korean Office Action, Korean Appln No. 10-2022-0061930, mailed on Oct. 19, 2023, 10 pages (with English Translation).
KIPO, Notice of Refusal to Grant a Patent for Application No. 110-2022-0061930, Oct. 19, 2023, 5 pages.

* cited by examiner

User Plane Protocol Stack

Control Plane Protocol Stack

3A-05

Terminal transmits to the base station UECapabilityInformation 3A-10

Terminal receives a RRCReconfiguration from the base station 3A-15

Terminal transmits to the base station a UEAssistanceInformation

METHOD AND APPARATUS FOR REPORTING IN-DEVICE COEXISTENCE INFORMATION IN WIRELESS MOBILE COMMUNICATION SYSTEM

CROSS-REFERENCE TO RELATED APPLICATION

This application claims priority to and the benefit of Korean Patent Application No. 10-2022-0061930, filed on May 20, 2022, the disclosure of which is incorporated herein by reference in its entirety.

BACKGROUND

Technical Field

The present disclosure relates to reporting in-device coexistence information for a terminal in wireless mobile communication system.

RELATED ART

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

In order to allow users to access various networks and services ubiquitously, an increasing number of UEs are equipped with multiple radio transceivers. For example, a UE may be equipped with NR, WiFi, and Bluetooth transceivers, and GNSS receivers. Due to extreme proximity of multiple radio transceivers within the same UE operating on adjacent frequencies or sub-harmonic frequencies, the interference power coming from a transmitter of the collocated radio may be much higher than the actual received power level of the desired signal for a receiver. This situation causes In-Device Coexistence (IDC) interference and is referred to as IDC problems. The challenge lies in avoiding or minimizing IDC interference between those collocated radio transceivers, as current state-of-the-art filter technology might not provide sufficient rejection for certain scenarios.

SUMMARY

Aspects of the present disclosure are to address in-device coexistence problem in a terminal. The method includes receiving from a base station a first Radio Resource Control (RRC) message, transmitting to the base station a second RRC message, the second RRC message includes an in-device coexistence information, receiving from the base station a third RRC message, and applying a configuration related to in-device coexistence based on the third RRC message. A first in-device coexistence information is included in the second RRC message if the first RRC message includes a first information, the first in-device coexistence information includes information related to frequency domain, the first information configures the terminal to report in-device coexistence information related to frequency domain. A second in-device coexistence information is included in the second RRC message if the first RRC message includes a second information, the second in-device coexistence information includes information related to time pattern, the second information configures the terminal to report in-device coexistence information related to time pattern.

DETAILED DESCRIPTION

Figure 1A:
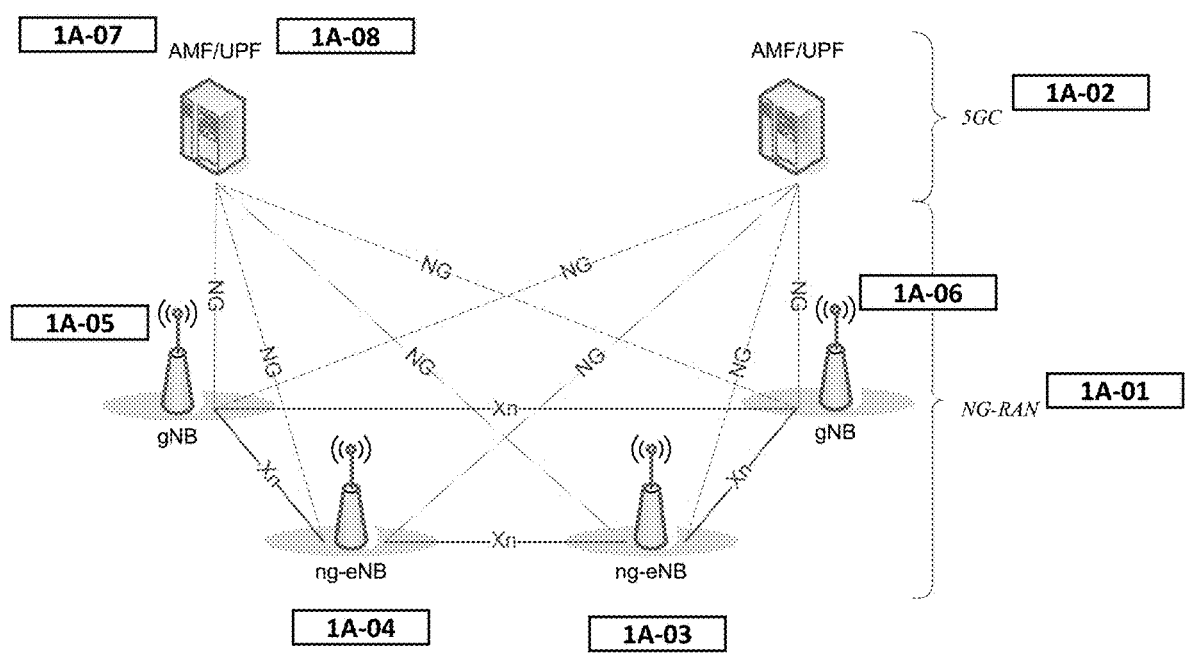
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CS-RNTI | Configured Scheduling-RNTI |
| PRB | Physical Resource Block | TAG | Timing Advance Group |
| PSS | Primary Synchronisation Signal | SDT | Small Data Transmission |
| PUCCH | Physical Uplink Control Channel | RA-SDT | Random Access -SDT |
| PUSCH | Physical Uplink Shared Channel | CG-SDT | Configured Grant-SDT |
| PTAG | Primary TAG | STAG | Secondary TAG |

Table 2 lists the terminologies and their definition used throughout the present disclosure.

TABLE 2

| Terminology | Definition |
|---|---|
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |

TABLE 2-continued

| Terminology | Definition |
| --- | --- |
| Cell Reselection Priority | Priority of a carrier frequency regarding cell reselection. System Information Block 2 and System Information Block 3 provide the CRP of the serving frequency and CRPs of inter-frequencies respectively. UE consider higher priority frequency for cell reselection if channel condition of the frequency is better than a specific threshold even if channel condition of a lower priority frequency is better than that of the higher priority frequency. |
| Dedicated signalling | Signalling sent on DCCH logical channel between the network and a single UE. |
| Field | The individual contents of an information element are referred to as fields. |
| Frequency layer | set of cells with the same carrier frequency. |
| Global cell identity | An identity to uniquely identifying an NR cell. It is consisted of cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| NR | NR radio access |
| PCell | SpCell of a master cell group. |
| registered PLMN | PLMN which UE has registered to |
| selected PLMN | PLMN which UE has selected to perform registration procedure |
| equivalent PLMN | PLMN which is equivalent to registered PLMN. UE is informed of list of EPLMNs by AMF during registration procedure |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| Serving Cell | For a UE in RRC_CONNECTED not configured with CA/DC there is only one serving cell comprising of the primary cell. For a UE in RRC_CONNECTED configured with CA/ DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| DCCH | DCCH is a logical channel to transfer RRC messages after RRC connection establishment |
| Suitable cell | A cell on which a UE may camp. Following criteria apply The cell is part of either the selected PLMN or the registered |

TABLE 2-continued

| Terminology | Definition |
|---|---|
| | PLMN or PLMN of the Equivalent PLMN list<br>The cell is not barred<br>The cell is part of at least one TA that is not part of the list of<br>"Forbidden Tracking Areas for Roaming" (TS 22.011 [18]), which<br>belongs to a PLMN that fulfils the first bullet above.<br>The cell selection criterion S is fulfilled (i.e. RSRP and RSRQ are<br>better than specific values |

In the present invention, "trigger" or "triggered" and "initiate" or "initiated" may be used in the same meaning.

FIG. 1A is a diagram illustrating the architecture of an 5G system and a NG-RAN to which the disclosure may be applied.

5G system consists of NG-RAN 1A-01 and 5GC 1A-02. An NG-RAN node is either:

a gNB, providing NR user plane and control plane protocol terminations towards the UE; or an ng-eNB, providing E-UTRA user plane and control plane protocol terminations towards the UE.

The gNBs 1A-05 or 1A-06 and ng-eNBs 1A-03 or 1A-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A-07 and UPF 1A-08 may be realized as a physical node or as separate physical nodes.

A gNB 1A-05 or 1A-06 or an ng-eNBs 1A-03 or 1A-04 hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the UE; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1A-07 hosts the functions such as NAS signaling, NAS signaling security, AS security control, SMF selection, Authentication, Mobility management and positioning management.

The UPF 1A-08 hosts the functions such as packet routing and forwarding, transport level packet marking in the uplink, QoS handling and the downlink, mobility anchoring for mobility etc.

Figure 1B:
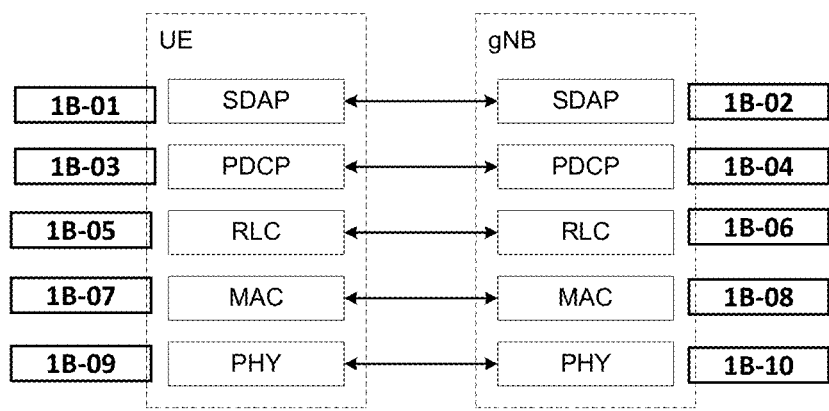
FIG. 1B is a diagram illustrating a wireless protocol architecture in an 5G system to which the disclosure may be applied.
Figure 1B:
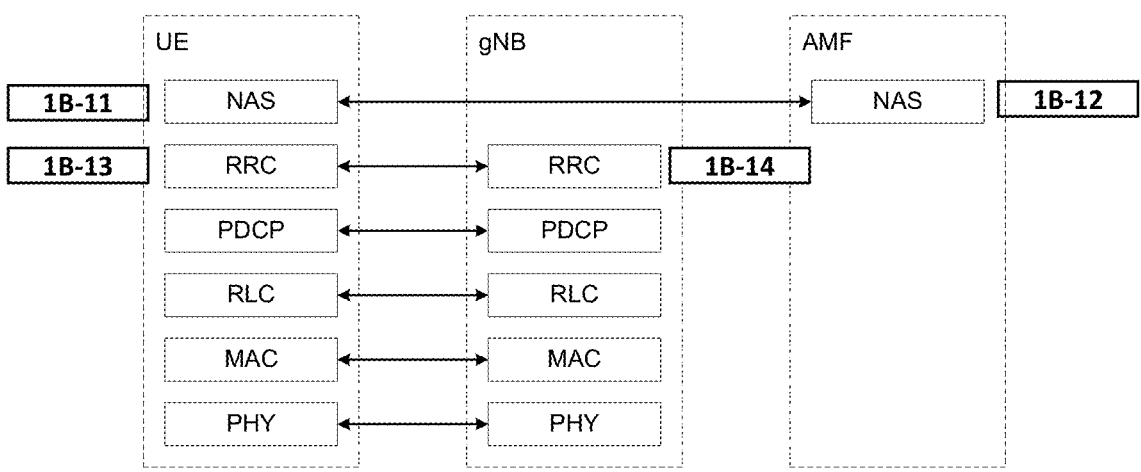

FIG. 1B is a diagram illustrating a wireless protocol architecture in an 5G system to which the disclosure may be applied.

User plane protocol stack consists of SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack consists of NAS 1B-11 or 1B-12, RRC 1B-13 or 1B-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
| --- | --- |
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging); RAN-based notification area (RNA) is managed by NG- RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. |
| RRC_CONNECTED | 5GC - NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
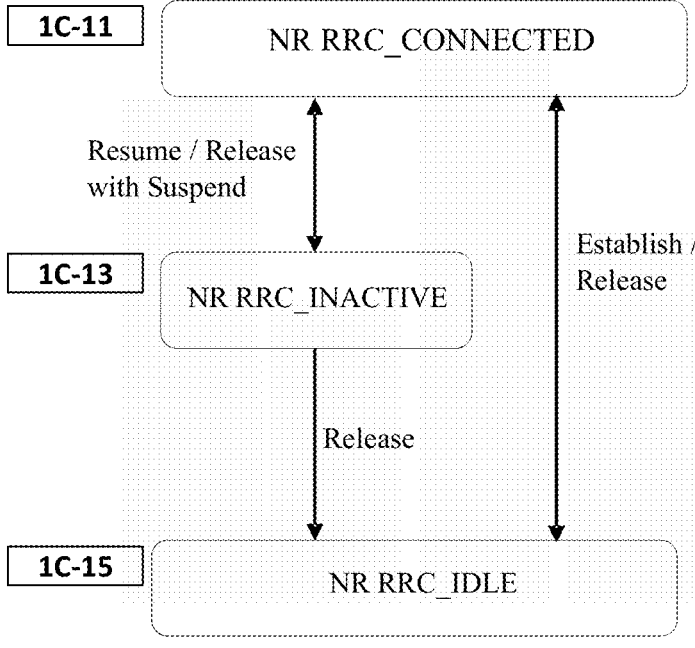
FIG. 1C is a diagram illustrating RRC state transition.

FIG. 1C is a diagram illustrating an RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC IDLE 1C-15 through RRC connection establishment and RRC connection release.

Figure 1D:
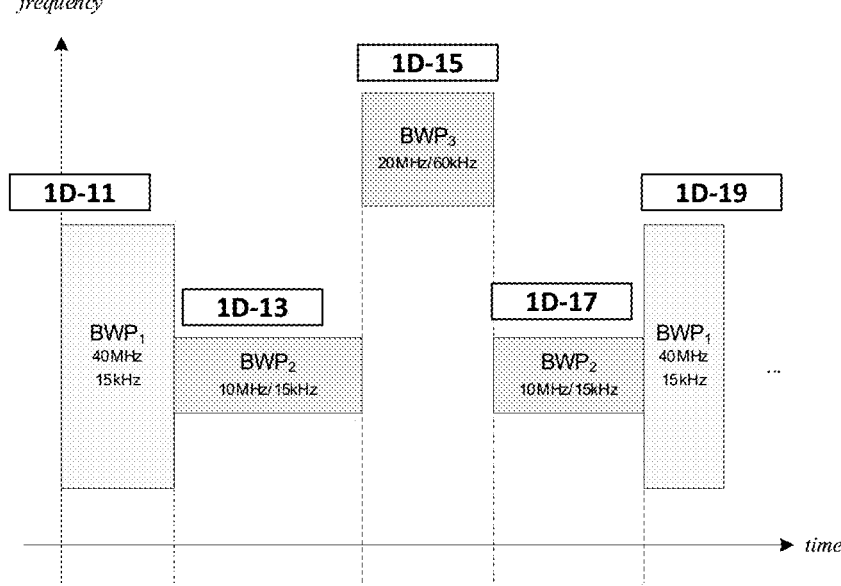
FIG. 1D is a diagram illustrating an example of a bandwidth part.

FIG. 1D is a diagram illustrating an example of a bandwidth part.

With Bandwidth Adaptation (BA), the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP) and BA is achieved by configuring the UE with BWP(s) and telling the UE which of the configured BWPs is currently the active one.

FIG. 1D describes a scenario where 3 different BWPs are configured:

BWP1 with a width of 40 MHz and subcarrier spacing of 15 kHz; 1D-11 or 1D-19

BWP2 with a width of 10 MHz and subcarrier spacing of 15 kHz; 1D-13 or 1D-17

BWP3 with a width of 20 MHz and subcarrier spacing of 60 kHz. 1D-15

Figure 1E:
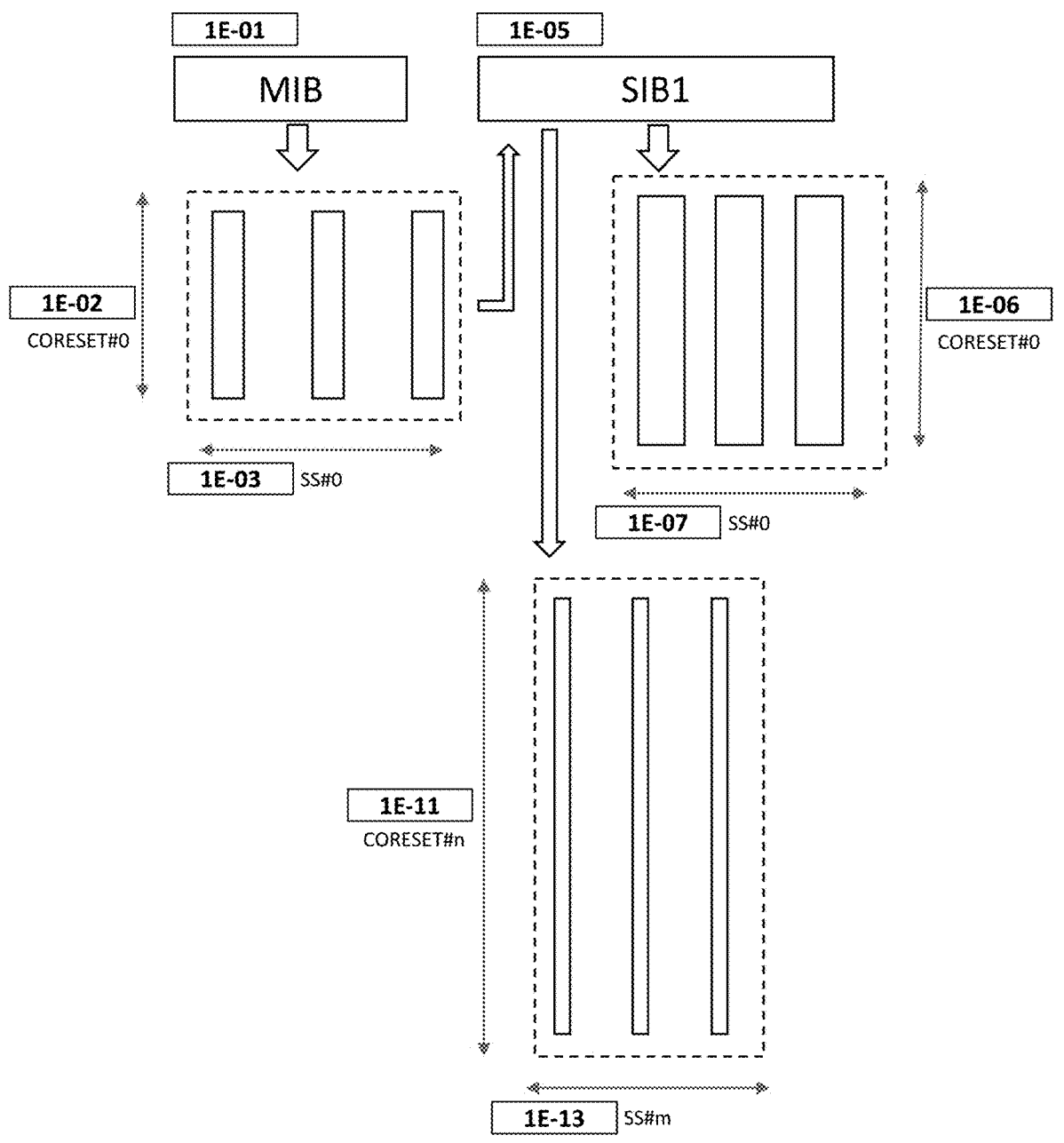
FIG. 1E is a diagram illustrating an example of a search space and a control resource set.

FIG. 1E is a diagram illustrating an example of a search space and a control resource set.

A plurality of SSs may be configured in one BWP. The UE monitors PDCCH candidates according to the SS configuration of the currently activated BWP. One SS consists of an SS identifier, a CORESET identifier indicating the associated CORESET, the period and offset of the slot to be monitored, the slot unit duration, the symbol to be monitored in the slot, the SS type, and the like. The information may be explicitly and individually configured or may be configured by a predetermined index related to predetermined values.

One CORESET consists of a CORESET identifier, frequency domain resource information, symbol unit duration, TCI status information, and the like.

Basically, it can be understood that CORESET provides frequency domain information to be monitored by the UE, and SS provides time domain information to be monitored by the UE.

CORESET #0 and SS #0 may be configured in the IBWP. One CORESET and a plurality of SSs may be additionally configured in the IBWP. Upon receiving the MIB 1E-01, the UE recognizes CORESET #0 1E-02 and SS #0 1E-03 for receiving SIB1 using predetermined information included in the MIB. The UE receives SIB1 1E-05 through CORESET #0 1E-02 and SS #0 1E-03. In SIB1, information constituting CORESET #0 1E-06 and SS #0 1E-07 and information constituting another CORESET, for example, CORESET #n1E-11 and SS #m 1E-13 may be included.

The terminal receives necessary information from the base station before the terminal enters the RRC_CONNECTED state, such as SIB2 reception, paging reception, and random access response message reception by using the CORESETs and SSs configured in SIB1. CORESET #0 1E-02 configured in MIB and CORESET #0 1E-06 configured in SIB1 may be different from each other, and the former is called a first CORESET #0 and the latter is called a second CORESET #0. SS #0 1E-03 configured in MIB and SS #0 1E-07 configured in SIB1 may be different from each other, and the former is referred to as a first SS #0 and the latter is referred to as a second SS #0. SS #0 and CORESET #0 configured for the RedCap terminal are referred to as a third SS #0 and a third CORESET #0. The first SS #0, the second SS #0, and the third SS #0 may be the same as or different from each other. The first CORESET #0, the second CORESET #0, and the third CORESET #0 may be the same as or different from each other. SS #0 and CORESET #0 are each indicated by a 4-bit index. The 4-bit index indicates a configuration predetermined in the standard specification. Except for SS #0 and CORESET #0, the detailed configuration of the remaining SS and CORSESET is indicated by each individual information element.

When the RRC connection is established, additional BWPs may be configured for the UE.

A Serving Cell may be configured with one or multiple BWPs.

UE can be configured with one or more DL BWPs and one or more UL BWPs in a serving cell. If the serving cell operates in paired spectrum (i.e., FDD band), the number of DL BWPs and the number of UL BWPs can be different. If the serving cell operates in unpaired spectrum (i.e., TDD band), the number of DL BWPs and the number of UL BWPs is same.

SIB1 includes a DownlinkConfigCommonSIB and a UplinkConfigCommonSIB and a tdd-UL-DL-ConfigurationCommon.

tdd-UL-DL-ConfigurationCommon is cell specific TDD UL/DL configuration. It consists of subfields such as referenceSubcarrierSpacing, pattern1, and pattern2.

referenceSubcarrierSpacing is the reference SCS used to determine the time domain boundary in the UL-DL pattern.

pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

DL-UL-TransmissionPeriodicity indicates the period of the DL-UL pattern.

NRofDownlinkSlots indicates the number of consecutive full DL slots in each DL-UL pattern.

NRofDownlinkSymbols indicates the number of consecutive DL symbols from the beginning of the slot following the last full DL slot.

NRofUplinkSlots indicates the number of consecutive full UL slots in each DL-UL pattern.

NRofUplinkSymbols indicates the number of consecutive UL symbols at the last time point of a slot preceding the first full UL slot.

slots between the last full DL slot and the first full UL slot are flexible slots. full UL slot is also called static UL slot. UL slot in this disclosure is static UL slot.

DownlinkConfigCommonSIB includes BWP-DownlinkCommon IE for initial DL BWP. UplinkConfigCommonSIB includes BWP-UplinkCommon IE for initial UL BWP. BWP-id of initialDownlinkBWP is 0.

A RRCReconfiguration message includes one or more BWP-Downlink and one or more BWP-Uplink and a firstActiveDownlinkBWP-Id and a bwp-InactivityTimer and a defaultDownlinkBWP-Id and a BWP-DownlinkDedicated for the initial DL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH of this BWP, cell specific parameters for the PDSCH of this BWP.

BWP-UplinkCommon IE includes following information: Frequency domain location and bandwidth of this bandwidth part, subcarrier spacing to be used in this BWP, cell specific parameters for the PUCCH of this BWP, cell specific parameters for the PUSCH of this BWP, Configuration of cell specific random access parameters.

BWP-DownlinkDedicated is used to configure the dedicated (UE specific) parameters of a downlink BWP. It includes cell specific parameters for the PDCCH of this BWP, cell specific parameters for the PDSCH of this BWP It includes Type2GapStatus. Type2GapStatus IE is enumerated with a single value of "deactivated". Alternatively, Type2GapStatus IE is enumerated with a single value of "activated". Alternatively, Type2GapStatus IE is enumerated with two values of "deactivated" and "activated". Alternatively, Type2GapStatus IE includes an DL BWP-Id.

The BWP-UplinkDedicated is used to configure the dedicated (UE specific) parameters of an uplink BWP.

firstActiveDownlinkBWP-Id contains the ID of the DL BWP to be activated upon performing the RRC (re-)configuration.

defaultDownlinkBWP-Id is the ID of the downlink bandwidth part to be used upon expiry of the BWP inactivity timer.

bwp-InactivityTimer is the duration in ms after which the UE falls back to the default Bandwidth Part.

Figure 2:
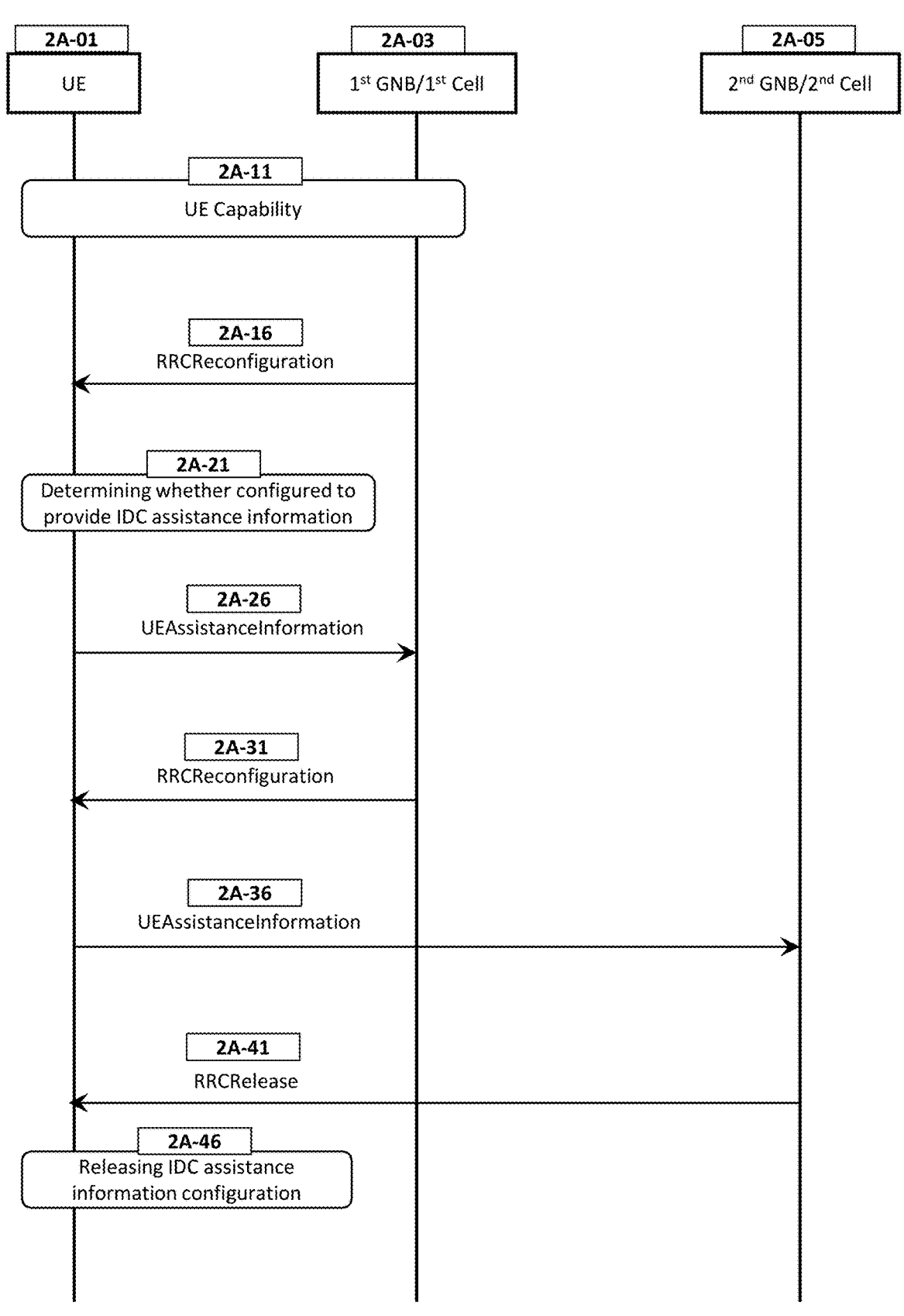
FIG. 2 is a diagram illustrating operations of a terminal and a base station according to an embodiment of the present invention.

FIG. 2 illustrates the operation of the terminal and base station.

In 2A-11, UE transmits to GNB UECapabilityInformation. GNB receives from UE UECapabilityInformation.

GNB determines whether to configure IDC assistance for the UE based on the received capability information. Before this step, UE receives system information including SIB1 in the first cell.

In 2A-16, GNB transmits to UE a first RRCReconfiguration. UE receives from GNB the first RRCReconfiguration.

The first RRCReconfiguration message includes a CellGroupConfig (configuring a master cell group or secondary cell group) and an otherConfig. The otherConfig may include zero or one idc_AssistanceConfig_1 and zero or one idc_AssistanceConfig_2 and zero or one idc_AssistanceConfig_3.

In 2A-21, UE determines whether it is configured to provide IDC assistance information based on the received idc_AssistanceConfig.

If the received otherConfig includes the idc_AssistanceConfig_1, and if idc_AssistanceConfig_1 is set to setup, UE consider itself to be configured to provide IDC_Assistance_1.

If the received otherConfig includes the idc_AssistanceConfig_1, and if idc_AssistanceConfig_1 is set to release, UE consider itself not to be configured to provide IDC_Assistance_1.

If the received otherConfig includes the idc_AssistanceConfig_2, UE consider itself to be configured to provide IDC_Assistance_2.

If the received otherConfig does not includes the idc_AssistanceConfig_2, UE consider itself not to be configured to provide IDC_Assistance_2.

If the received otherConfig includes the idc_AssistanceConfig_3, UE consider itself to be configured to provide IDC_Assistance_3.

If the received otherConfig does not includes the idc_AssistanceConfig_3, UE consider itself not to be configured to provide IDC_Assistance_3.

If the received otherConfig includes the idc_AssistanceConfig_1 and idc_AssistanceConfig_2, and if idc_AssistanceConfig_1 is set to setup, UE consider itself to be configured to provide IDC_Assistance_1 and IDC_Assistance_2.

If the received otherConfig includes the idc_AssistanceConfig_1 and idc_AssistanceConfig_3, and if idc_AssistanceConfig_1 is set to setup, UE consider itself to be configured to provide IDC_Assistance_1 and IDC_Assistance_3.

If the received otherConfig includes the idc_AssistanceConfig_1 and idc_AssistanceConfig_2 and idc_AssistanceConfig_3, and if idc_AssistanceConfig_1 is set to setup, UE consider itself to be configured to provide IDC_Assistance_1 and IDC_Assistance_2 and IDC_Assistance_3.

To ensure backward compatibility, idc_AssistanceConfig_3 is placed after idc_AssistanceConfig_1.

In 2A-26, UE transmits to GNB UEAssistanceInformation to report IDC problem. GNB receives from the UE UEAssistanceInformation.

A UE that can provide IDC assistance information in RRC_CONNECTED and was configured to do so may initiate UEAssistanceInformation transmission procedure upon A or upon B. A is IDC problem detection when (of if) the UE did not transmit an IDC assistance information since it was configured to provide IDC indications. B is change of IDC problem information.

If UE is configured to provide IDC_Assistance_1 and if the UE did not transmit a UEAssistanceInformation with IDC_Assistance_1 since it was configured to provide IDC_Assistance_1 and if on one or more frequencies included in candidateServingFreqListNR the UE is experiencing IDC problems that it cannot solve by itself, UE initiates transmission of the UEAssistanceInformation to provide IDC_Assistance_1.

If UE is configured to provide IDC_Assistance_1 and if the UE did not transmit a UEAssistanceInformation with IDC_Assistance_1 since it was configured to provide IDC_Assistance_1 and if on one or more supported UL CA combination comprising of carrier frequencies included in candidateServingFreqListNR the UE is experiencing IDC problems that it cannot solve by itself, UE initiates transmission of the UEAssistanceInformation to provide IDC_Assistance_1.

If UE is configured to provide IDC_Assistance_1 and if the current IDC_Assistance1 is different from the one indicated in the last transmission of the UEAssistanceInformation, UE initiates transmission of the UEAssistanceInformation to provide IDC_Assistance_1.

If UE is configured to provide IDC_Assistance_2 and if the UE did not transmit a UEAssistanceInformation with IDC_Assistance_2 since it was configured to provide IDC_Assistance_2 and if on one or more frequency resource portions (contiguous PRBs of a BWP) of one or more active serving cell the UE is experiencing IDC problems that it cannot solve by itself, UE initiates transmission of the UEAssistanceInformation to provide IDC_Assistance_2.

If UE is configured to provide IDC_Assistance_2 and if the current IDC_Assistance_2 is different from the one indicated in the last transmission of the UEAssistanceInformation, UE initiates transmission of the UEAssistanceInformation to provide IDC_Assistance_2.

If UE is configured to provide IDC_Assistance_1 and IDC_Assistance_3 and if the UE did not transmit a UEAssistanceInformation with IDC_Assistance_1 and IDC_Assistance_3 since it was configured to provide IDC_Assistance_1 and IDC_Assistance_3 and if on one or more supported UL CA combination comprising of carrier frequencies included in candidateServingFreqListNR the UE is experiencing IDC problems that it cannot solve by itself, UE initiates transmission of the UEAssistanceInformation to provide IDC_Assistance_1 and IDC_Assistance_3.

If UE is configured to provide IDC_Assistance_2 and IDC_Assistance_3 and if the UE did not transmit a UEAssistanceInformation with IDC_Assistance_2 and IDC_Assistance_3 since it was configured to provide IDC_Assistance_2 and IDC_Assistance_3 and if on one or more frequency resource portions (contiguous PRBs of a BWP) of one or more active serving cell the UE is experiencing IDC problems that it cannot solve by itself, UE initiates transmission of the UEAssistanceInformation to provide IDC_Assistance1 and IDC_Assistance_3.

If UE is configured to provide IDC_Assistance_3 and if the current IDC_Assistance_3 is different from the one indicated in the last transmission of the UEAssistanceInformation, UE initiates transmission of the UEAssistanceInformation to provide IDC_Assistance_3.

If transmission of the UEAssistanceInformation is initiated to provide IDC_Assistance_1, UE includes the following fields in the UEAssistanceInformation: zero or one affectedCarrierFreqList and zero or one affectedCarrierFreqCombList.

If transmission of the UEAssistanceInformation is initiated to provide IDC_Assistance_2, UE includes the following fields in the UEAssistanceInformation: zero or one affectedResourceList and zero or one affectedResourceComboList.

If transmission of the UEAssistanceInformation is initiated to provide IDC_Assistance_3, UE includes the following fields in the UEAssistanceInformation: a idc_TimePatternList.

In 2A-31, GNB transmits to UE a second RRCReconfiguration. UE receives from GNB the second RRCReconfiguraiton.

GNB may determine to command handover to mitigate the IDC problem reported by the UE.

In 2A-36, if reconfigurationWithSync was included in CellGroupConfig for master cell group in the RRCReconfiguration, UE performs random access procedure and transmits RRCReconfigurationComplete message to the GNB.

If reconfigurationWithSync was included in CellGroupConfig for master cell group in the RRCReconfiguration and if the UE initiated transmission of a UEAssistanceInformation for IDC_Assistance_1 (or IDC_Assistance_2 or IDC_Assistance_3) during the last 1 second, and the UE is still configured to provide the IDC_Assistance_1 (or IDC_Assistance_2 or IDC_Assistance_3), UE initiate transmission of a UEAssistanceInformation for IDC_Assistance_1 (or IDC_Assistance_2 or IDC_Assistance_3).

Since the first GNB succeed in receiving the first UEAssistanceInformation transmitted in the first cell but fails to forward it to the second GNB, UE transmits the second UEAssistanceInformation in the second cell after handover.

In 2A-41, GNB transmits to UE a RRCRelease. UE receives from GNB the RRCRelease.

GNB may determine to transit UE to RRC_INACTIVE when there is no data for the UE and there will likely be data for the UE in the near future.

If the RRCRelease message includes a SsuspendConfig, UE enters into RRC_INACTIVE state. If the SuspendConfig includes a SDT-config, UE can initiate SDT procedure during RRC_INACTIVE state if new data arrives in SRB1.

During RRC_INACTIVE state, if IDC problem disappear and transmission of IDC_Assistance_1 (and/or IDC_Assistance_2 and/or IDC_Assistance_3) is initiated, UE initiate SDT procedure to transmit IDC_Assistance_1 (or IDC_Assistance_2 or IDC_Assistance_3) via SRB1. Since, IDC problem usually does not exist in RRC_INACTIVE state, reporting it during RRC_INACTIVE only causes UE battery consumption. To avoid this, UE release idc_AssistanceConfig_1 (and/or idc_AssistanceConfig_2 and/or idc_AssistanceConfig_3) when RRCReelease message is received and if the RRCRelease message includes a SuspendConfig and if the SuspendConfig includes SDT-Cofnig.

In 2A-46, UE release idc_AssistanceConfig_1 (and/or idc_AssistanceConfig_2 and/or idc_AssistanceConfig_3)

when RRC connection resume procedure is initiated, if RRCReelease message is received and if the RRCRelease message includes a SuspendConfig and if the SuspendConfig does not includes SDT-Cofnig.

UECapabilityInformation includes following IDC related capability information: a inDeviceCoexInd and a inDeviceCoexInd_2 and a inDeviceCoexInd_3.

The inDeviceCoexInd indicates whether UE supports a first IDC assistance information (i.e., whether UE supports reception of IDC_AssistanceConfig_1 and transmission of IDC_Assistance_1).

The inDeviceCoexInd_2 indicates whether UE supports a second IDC assistance information (i.e., whether UE supports reception of IDC_AssistanceConfig_2 and transmission of IDC_Assistance_2).

The inDeviceCoexInd_3 indicates whether UE supports a third IDC assistance information (i.e., whether UE supports reception of IDC_AssistanceConfig_3 and transmission of IDC_Assistance_3).

CellGroupConfig is used to configure a master cell group (MCG) or secondary cell group (SCG). A cell group comprises of one MAC entity, a set of logical channels with associated RLC entities and of a primary cell (SpCell) and one or more secondary cells (SCells). CellGroupConfig includes following fields: zero or one spCellConfig, zero or one or more SCellConfig.

SPCellConfig is parameters for the SpCell of this cell group (PCell of MCG or PSCell of SCG). spCellConfig includes following fields: a servCellIndex, a reconfigurationWithSync and a ServingCellConfig SCellConfig is parameters for the SCell. spCellConfig includes following fields: a sCellIndex, a ServingCellConfigCommon and a ServingCellConfig The SCellIndex is a short identity to identify an SCell.

The reconfigurationWithSync is parameters for the SpCell. If spCellConfig in CellGroupConfig in RRCReconfigurationincludes reconfigurationWithSync, handover is initiated. The reconfigurationWithSync includes following fields:a ServingCellConfigCommon, a newUE-Identity, t304 and a rach-ConfigDedicated.

newUE-Identity indicates the C-RNTI to be used in the target cell after handover.

ServingCellConfigCommon includes one DownlinkConfigCommon and two UplinkConfigCommon. One UplinkConfigCommon is for a NUL (normal uplink) and the other UplinkConfigCommon is for a SUL (supplementary uplink). UplinkConfigCommon for a SUL is located after UplinkConfigCommon is for a NUL.

DownlinkConfigCommon includes FrequencyInfoDL and BWP-DownlinkCommon. BWP-DownlinkCommon is for the initial DL BWP and includes PDCCH-ConfigCommon and PDSCH-ConfigCommon.

UplinkConfigCommon includes FrequencyInfoUL and TimeAlignmentTimer and BWP-UplinkCommon. BWP-UplinkCommon is for the initial UL BWP. BWP-UplinkCommon includes RACH-ConfigCommon and PUSCH-ConfigCommon and PUCCH-ConfigCommon and a plurality of RACH-ConfigCommon-fc.

DownlinkConfigCommon is a common downlink configuration of the serving cell. It consists of subfields such as FrequencyInfoDL and BWP-DownlinkCommon.

FrequencyInfoDL is a basic parameter of a downlink carrier. It consists of subfields such as a frequency band list and carrier bandwidth for each SCS.

BWP-DownlinkCommon is the configuration of the second downlink IBWP. It consists of subfields such as BWP, PDCCH-ConfigCommon, and PDSCH-ConfigCommon.

The first IBWP has a frequency domain corresponding to the first CORESET #0 of the MIB and has subcarrier spacing indicated by the MIB. The first IBWP is the IBWP indicated by the MIB and receiving 1, the second IBWP is the IBWP indicated by the 1 and receiving the 2, paging, random access response message, and the like.

BWP is IE that configures general parameters of BWP. It consists of subfields such as locationAndBandwidth indicating the bandwidth and location of the BWP, and subcarrierSpacing indicating the SCS of the BWP.

ServingCellConfig includes a BWP-DownlinkDedicated (for the second initial downlink BWP) and zero or one or more BWP-Downlink IEs (for dedicate downlink BWPs) and a UplinkConfig IE (for normal uplink) and a UplinkConfig IE (for supplementary uplink). The UplinkConfig IE includes a BWP-UplinkDedicated (for the second initial uplink BWP) and zero or one or more BWP-Uplink IEs (for dedicate uplink BWPs).

A BWP-Downlink consists of a BWP-Id IE and a BWP-DownlinkCommon IE and a BWP-DownlinkDedicated IE.

A BWP-Uplink consists of a BWP-Id IE and a BWP-UplinkCommon IE and a BWP-UplinkDedicated IE.

A BWP-DownlinkDedicated consists of a PDCCH-Config and a PDSCH-Config. The PDCCH-Config is used to configure UE specific PDCCH parameters such as control resource sets (CORESET), search spaces and additional parameters for acquiring the PDCCH. The PDSCH-Config is used to configure the UE specific PDSCH parameters.

A BWP-UplinkDedicated consists of a PUCCH-Config and a PUSCH-Config. The PUCCH-Config is used to configure UE specific PUCCH parameters. The PUSCH-Config is used to configure the UE specific PUSCH parameters.

IDC_AssistanceConfig_1 field set to either setup or release. If idc_AssistanceConfig_1 field set to setup, this field includes a IDC_AssistanceConfig_1 IE. The IDC_AssistanceConfig_1 IE configure UE to report assistance information to inform the gNB about UE detected IDC problem. The IDC_AssistanceConfig_1 IE consists of a CandidateServingFreqListNR. The CandidateServingFreqListNR indicates, for each candidate NR serving cells, the center frequency around which UE is requested to report IDC issues. The CandidateServingFreqListNR includes one or more ARFCN-ValueNR_1. If idc_AssistanceConfig_1 field set to setup, UE determines the contents of IDC_Assistance_1 based at least in part on the frequencies indicated in the CandidateServingFreqListNR.

IDC_AssistanceConfig_2 field indicates a single value of TRUE. If idc_AssistanceConfig_2 is included, UE determines the contents of IDC_Assistance_1 based at least in part on the currently active serving cells.

IDC_AssistanceConfig_3 field indicates a single value of TRUE. If idc_AssistanceConfig_3 is included, UE determines the contents of IDC_Assistance_3 based at least in part on a specific serving cell. More specifically, TDD-UL-DL-ConfigCommon of the PCell is considered.

IDC_Assistance_1 is used to report the carriers where the IDC problem is detected.

IDC_Assistance_2 is used to report the PRBs (or BWPs) where the IDC problem is detected.

IDC_Assistance_3 is used to report the required time pattern to solve the detected IDC problem.

IDC_Assistance_1 includes zero or one affectedCarrierFreqList and zero or one affectedCarrierFreqCombList.

The affectedCarrierFreqList indicates a list of NR carrier frequencies that are affected by IDC problem. The affectedCarrierFreqList consists of one or more AffectedCarrierFreq. The AffectedCarrierFreq consists of a ARFCN_ValueNR_1 or a ARFCN_Value_2 and a interferenceDirection. The interferenceDirection indicates the direction of IDC interference. Value_nr indicates that only NR is victim of IDC interference, value_other indicates that only another radio is victim of IDC interference and value_both indicates that both NR and another radio are victims of IDC interference.

The affectedCarrierFreqCombList indicates a list of NR carrier frequency combinations that are affected by IDC problems due to Inter-Modulation Distortion and harmonics from NR when configured with UL CA. The affectedCarrierFreqCombList consists of one or more AffectedCarrierFreqComb. The AffectedCarrierFreqComb consists of a plurality of ARFCN_ValueNR_2 and a victimSystemType. The victimSystemType indicate the list of victim system types to which IDC interference is caused from NR when configured with UL CA. Value_gps, Value_glonass, Value_bds, Value_galileo and Value_navIC indicates the type of GNSS. Value_wlan indicates WLAN and value Bluetooth indicates Bluetooth.

IDC_Assistance_2 includes a affectedResourceList and a affectedResourceComboList.

The affectedCarrierFreqList indicates a list of frequency resource portions that are affected by IDC problem. The affectedResourceList includes one or more affectedResource. An affectedResource consists of following fields: a ARFCN_ValueNR2, a locationAndBandwidth, a interferenceDirection and zero or one victimSystemType. The affectedResource indicates a portion of frequency domain resource.

The locationAndBandwidth indicates Frequency domain location and bandwidth of the frequency portion that are affected by IDC problem. The locationAndBandwidth indicates starting PRB and the number of PRBs. The value of the field is interpreted as resource indicator value (RIV) with setting the size of BWP equal to 275. A RIV indicates contiguous resource blocks (i.e., frequency resource portion) within a BWP. A RIV corresponds to an offset of the frequency resource portion from the lowest resource block and a length of the frequency resource portion.

The frequency domain location of PRB0 is determined based on ARFCN_ValueNR2. The frequency domain resource portion indicated by the starting PRB and the number of PRBs is determined based on the frequency domain location of PRB0.

The vitimSystemType is included in the IDC_Assistance_2 if the interferenceDirection is set to either value_other or value_both.

Alternatively, a affectedResource consists of following fields: a servCellIndex, a DL_UL_SUL_indicator, a bwp-Id, zero or one locationAndBandwidth, a interferenceDirection and zero or one victimSystemType.

The servCellIndex is used to uniquely identify a serving cell. Value_0 applies for the PCell. SCellIndex that has previously been assigned for a SCell applies for the SCell. The servCellIndex indicates the serving cell where the frequency resource portion having IDC problem belongs to.

The DL_UL_SUL_indicator indicates either a downlink or a uplink or a supplementary uplink.

The bwp-Id indicates the BWP where the frequency resource portion having IDC problem belongs to.

Which PRBs of which BWP of which serving cell is experiencing IDC problem is determined based at least in part on the servCellIndex and the DL_UL_SUL_indicator and the bwp-Id and the locationAndBandwidth.

If locationAndBandwidth is not present in an affectedResource, the whole BWP(all PRBs in the BWP) indicated by the bwp-id and the DL_UL_SUL_indicator is experiencing IDC problem.

The affectedResourceComboList indicates a list of combinations of frequency resource portions that are affected by IDC problems due to Inter-Modulation Distortion and harmonics from NR when configured with UL CA. The affectedResourceComboList consists of one or more affectedResourceCombo. The affectedResourceCombo consists of following fields: a plurality of affectedResource2 and a victim system.

The affectedResource2 consists of an ARFCN_ValueNR2 and a locationAndBandwidth. Alternatively, the affectedResource2 consists of a servCellIndex and a UL_SUL_indicator and a bwp-Id and a locationAndBandwidth.

If the UL_SUL_indicator is not included in the affectedResource2, a predefined uplink is applied for the affectedResource2. The predefined uplink is either normal uplink or supplementary uplink.

IDC_Assistance_3 includes an idc_TimePatternList. The idc_TimePatternList is a list of one or more slot patterns indicating which slots NR is requested to abstain from using. Value 0 indicates that NR is requested to abstain from using the slot. The idc_TimePatternList includes one or more idc_TimePattern. An idc_TimePattern field includes following fields: a FR_indicator, a reference_cell and a TimePatternBitmap.

The FR_indicator indicates the frequency range that is associated with the TimePatternBitmap. The FR_indicator indicates either FR1 or FR2-1 or FR2-2. FR1 is the frequency range below 6 GHz. FR2-1 is the frequency range above 24 GHz and below 52.6 GHz. FR2-2 is the frequency range above 52.6 GHz.

The reference_cell indicates the serving cell that provide the time reference for the TimePatternBitmap. The reference_cell indicates either PCell or PSCell. Alternatively, the reference_cell indicates servCellIndex.

The TimePatternBitmap is one of a Bitmap1 (10 bit) and a Bitmap2 (20 bit) and a Bitmap3 (40 bit) and a Bitmap4 (80 bit) and a Bitmap5 (160 bit). The size of each Bitmap is determined by the SCS of a serving cell and the periodicity of TDD-UL-DL-ConfigCommon of the serving cell. The serving cell is indicated by reference_cell. Each bit of the Bitmap corresponds to a slot of the serving cell. Hence, the size of the Bitmap is equal to the number of slots during a period of the UL/DL configuration. For example, if SCS of the serving cell is 160 KHz and the periodicity of the serving cell is 10 ms, one UL/DL configuration consists of 160 slots and the size of the corresponding Bitmap is 160 bit.

UE determines based on the IDC problem which slots of which serving cell (and which FR) should be abstained from using to solve the IDC problem. UE makes the corresponding Bitmap and transmits the Bitmap in the IDC_Assistance_3.

ARFCN_ValueNR is used to indicate the ARFCN applicable for a downlink, uplink or bi-directional (TDD) NR global frequency raster.

The ARFCN_ValueNR_1 is a ARFCN_ValueNR associated with a serving frequency(intra-frequency) or a non-serving/neighboring frequency(inter-frequency). The ARFCN_ValueNR_1 indicates the frequency of the SS associated to a measurement object (in case that IDC is in a neighboring frequency) or frequency of the SSB to be used for a serving cell (in case that IDC is in a serving frequency).

The ARFCN_ValueNR_2 is a ARFCN_ValueNR indicating a Point A of an uplink carrier or of a downlink carrier.

The ARFCN_ValueNR_2 is the absolute frequency of the reference resource block (Common RB 0). The lowest subcarrier of Common RB0 is known as Point A. The ARFCN_ValueNR_2 indicates the Point A of a carrier.

The ARFCNValueNR_3 is a ARFCN_ValueNR associated with a BWP. The ARFCN_ValueNR_3 is the absolute frequency of the lowest subcarrier of lowest resource block of the BWP.

SuspendConfig may include the following fields.

1. The first UE identifier: an identifier of a UE that may be included in the ResumeRequest when a state transition to RRC_CONNECTED is made. It has a 40-bit length.

2. The second UE identifier: an identifier of a UE that may be included in the Resume Request when a state transition to RRC_CONNECTED is made. It has a 24-bit length.

3. ran-Paging Cycle: Paging cycle to be applied in RRC_INACTIVE state.

4. ran-Notification AreaInfo: Configuration information of a ran-Notification Area consisting of a list of cells and the like. UE initiates a resume procedure when the ran_Notification Area is changed.

5. t380: Timer related to the periodic resumption procedure.

6. NextHopChangingCount (NCC): Counter used to derive new security keys after performing the resume procedure.

7. SDT-Config: Configuration information for SDT.

Small Data Transmission (SDT) is a procedure allowing data and/or signalling transmission while remaining in RRC_INACTIVE state (i.e., without transitioning to RRC-_CONNECTED state).

SDT-Config field includes a SDT-Config IE. The SDT-Config IE includes following fields: a sdt-DRB-List, a sdt-SRB2-Indication, a sdt-MAC-PHY-CG-Config, a sdt-DRB-ContinueEHC.

SDT-DRB-ContinueEHC includes a IE indicating one of cell and ma. This field indicates whether the PDCP entity for the radio bearers configured for SDT continues or resets the EHC header compression protocol during PDCP re-establishment during SDT procedure. Value cell indicates that ROHC header compression continues when UE resumes for SDT in the same cell as the PCell when the RRCRelease message is received. Value ma indicates that EHC header compression continues when UE resumes for SDT in a cell belonging to the same RNA as the PCell when the RRCRelease message is received. If the field is absent PDCP entity for the radio bearers configured for SDT reset the EHC header compression protocol during PDCP re-establishment during SDT procedure.

SDT-DRB-List includes zero or one or more DRB-Identities. This field indicates the ID(s) of the DRB(s) that are configured for SDT. If size of the sequence is zero, then UE assumes that none of the DRBs are configured for SDT.

SDT-SRB2-Indication includes a IE indicating allowed. This field indicates whether SRB2 is configured for SDT or not. If the field is absent SRB2 is not configured for SDT.

The terminal transmits to the base station a UECapabilityInformation.

The base station receives from the UE the UECapabilityInformation.

The UECapabilityInformationincludes a UE-NR-Capability.

The UE-NR-Capability includes zero or one inDeviceCoexInd and zero or one inDeviceCoexInd_2 and zero or one inDeviceCoexInd_3.

The inDeviceCoexInd indicates whether the terminal supports a first IDC assistance information.

The first IDC assistance information consists of information on one or more carriers related to IDC problem.

The inDeviceCoexInd_2 indicates whether the terminal supports a second IDC assistance information.

The second IDC assistance information consists of information on one or more frequency resources related to IDC problem. The frequency resource consists of contiguous PRB s within a BWP.

The inDeviceCoexInd_3 indicates whether the terminal supports a third IDC assistance information.

The third IDC assistance information consists of information on one or more time patterns. The time pattern consists of a bitmap. The length of the bitmap is related to the periodicity of TDD-UL-DL-ConfigCommon of a first serving cell and a SCS of a first BWP of a the first serving cell. The first serving cell is PCell. The first BWP is the currently active BWP or the initial BWP.

The inDeviceCoexInd_2 is included in the UE-NR-Capability if the inDeviceCoexInd_1 is included in the UE-NR-Capability.

The inDeviceCoexInd_3 is included in the UE-NR-Capability if the inDeviceCoexInd_1 is included in the UE-NR-Capability.

The base station transmits to the terminal a first RRCReconfiguration.

The terminal receives from the base station the first RRCReconfiguration.

The first RRCReconfiguration includes zero or one idc_AssistanceConfig_1 and zero or one idc_AssistanceConfig_2 and zero or one idc_AssistanceConfig_3.

The first RRCReconfiguration can include either a idc_AssistanceConfig_1 or a idc_AssistanceConfig_2 or a idc_AssistanceConfig_1 and a idc_AssistanceConfig_3 or idc_AssistanceConfig_2 and a idc_AssistanceConfig_3.

If idc_AssistanceConfig_1 is not included in the first RRCReconfiguration message, idc_AssistanceConfig_2 is included in the first RRCReconfiguration.

The idc_AssistanceConfig_1 consists of one or more ARFCN_ValueNR_1.

The idc_AssistanceConfig_2 consists of a first IE indicating a single value. If idc_AssistanceConfig_2 is included in the RRCReconfiguration and set to a first value, the terminal consider itself to be configured to provide the second IDC assistance information.

The idc_AssistanceConfig_3 consists of a second IE indicating a single value. If idc_AssistanceConfig_3 is included in the RRCReconfiguration and set to a second value, the terminal consider itself to be configured to provide the third IDC assistance information.

The ARFCN_ValueNR_1 (absoluteFrequencySSB) indicates the center frequency of a SS block. The ARFCN_ValueNR_1 indicates the center frequency of a carrier.

The ARFCN_ValueNR_2 (absoluteFrequencyPointA) indicates the absolute frequency of the reference resource block. The ARFCN_ValueNR_2 indicates the lowest subcarrier of the reference resource block. The ARFCN_ValueNR2 indicates the lowest frequency of the reference resource block.

The terminal transmits to the base station a UEAssistanceInformation.

The base station receives from the terminal the UEAssistanceInformation.

The UEAssistanceInformation includes zero or one first IDC assistance information zero or one second IDC assistance information or zero or one third IDC assistance information. The first IDC assistance information and the second IDC assistance information are not included in a UEAssistanceInformation simultaneously.

The first IDC assistance information consists of information on one or more carriers related to IDC problem.

The second IDC assistance information consists of information on one or more frequency resources related to IDC problem. The frequency resource consists of contiguous PRBs within a BWP The third IDC assistance information consists of one or more time patterns. The time pattern consists of a bitmap. The length of the bitmap is related to the periodicity of TDD-UL-DL-ConfigCommon of a first serving cell and a SCS of a first BWP of a the first serving cell.

The first serving cell is PCell. The first BWP is the currently active BWP or the initial BWP.

The terminal transmits to the base station a UEAssistanceInformation.

The base station receives from the terminal the UEAssistanceInformation.

The UEAssistanceInformation includes a second IDC assistance information.

The second IDC assistance information includes an affected_Resource_List.

The affected_Resource_List consists of one or more affected_Resource.

An affected_Resource consists of at least an ARFCN_ValueNR2 and a locationAndBandwidth.

The locationAndBandwidth indicates one or more contiguous PRBs that are affected by IDC problem.

The terminal transmits to the base station a UEAssistanceInformation.

The base station receives from the terminal the UEAssistanceInformation.

The UEAssistanceInformation includes a second IDC assistance information.

The second IDC assistance information includes an affected_Resource_List.

The affected_Resource_List consists of one or more affected_Resource.

An affected_Resource consists of at least a servCellIndex and a DL_UL_SUL_indicator and a bwp-Id and a locationAndBandwidth.

The locationAndBandwidth indicates one or more contiguous PRBs that are affected by IDC problem.

The one or more contiguous PRBs are PRBs of a first BWP of first link of first cell. The first BWP is indicated by the bwp-Id. The first link is indicated by DL_UL_SUL_indicator and is one of downlink and normal uplink and supplementary uplink. The first cell is indicated by the servCellIndex.

The terminal transmits to the base station a UEAssistanceInformation.

The base station receives from the terminal the UEAssistanceInformation.

The UEAssistanceInformation includes a second IDC assistance information.

The second IDC assistance information includes an affected_Resource_Combo_List.

The affected_Resource_Combo_List consists of one or more affected_Resource_Combo.

The affected_Resource_Combo consists of two or more affected_Resource2.

The affected_Resource2 consists of at least an ARFCN_ValueNR2 and a locationAndBandwidth.

The locationAndBandwidth in an affected_Resource_Combo indicates one or more contiguous PRBs that are affected by IDC problem if aggregated with (or used together with) one or more contiguous PRBs indicated by other affected_Resource2 in the same affected_Resource_Combo.

The terminal transmits to the base station a UEAssistanceInformation.

The base station receives from the terminal the UEAssistanceInformation.

The UEAssistanceInformation includes a second IDC assistance information.

The second IDC assistance information includes an affected_Resource_Combo_List.

The affected_Resource_Combo_List consists of one or more affected_Resource_Combo.

The affected_Resource_Combo consists of two or more affected_Resource2.

The affected_Resource2 consists of at least a servCellIndex and a UL_SUL_indicator and a bwp-Id and a locationAndBandwidth.

The locationAndBandwidth in an affected_Resource_Combo indicates one or more contiguous PRBs that are affected by IDC problem if aggregated with (or used together with) one or more contiguous PRBs indicated by other affected_Resource2 in the same affected_Resource_Combo.

The one or more contiguous PRBs are PRBs of a first BWP of first uplink of first cell. The first BWP is indicated by the bwp-Id. The first uplink is determined by the presence of UL_SUL_indicator. The first uplink is a normal uplink, if the UL_SUL_indicator is present, and is a supplementary uplink if absent. The first cell is indicated by the servCellIndex.

The terminal transmits to the base station a UEAssistanceInformation.

The base station receives from the terminal the UEAssistanceInformation.

The UEAssistanceInformation includes a third IDC assistance information.

The third IDC assistance information includes an idc_TimePatternList.

The idc_TimePatternList consists of one or more idc_TimePattern.

The idc_TimePattern consists of a FR_indicator and a reference_cell and a TimePatternBitmap.

The size of the TimePatternBitmap is selected from a group of fixed values. The size of the TimePatternBitmap is related with the periodicity of TDD UL/DL configuration of a serving cell indicated by reference_cell.

The base station transmits to the terminal a second RRCReconfiguration in a first cell.

The base station, in a second cell, receives from the terminal a UEAssistanceInformation including the second IDC assistance information, if the second RRCReconfiguration included reconfigurationWithSync and if the transmission of a UEAssistanceInformation for the second IDC assistance information was initiated during the last 1 second in the first cell and if the UE is still configured to provide the second IDC assistance information.

The terminal receives from the base station the second RRCReconfiguration in the first cell.

The terminal, in a second cell, transmits to the base station a UEAssistanceInformation including the second IDC assistance information, if the second RRCReconfiguration included reconfigurationWithSync and if the transmission of a UEAssistanceInformation for the second IDC assistance information was initiated during the last 1 second in the first cell and if the UE is still configured to provide the second IDC assistance information.

The base station transmits to the terminal a RRCRelease in the second cell.

The terminal releases idc_AssistanceConfig_1 (and/or idc_AssistanceConfig_2 and/or idc_AssistanceConfig_3) in the second cell before entering into RRC_INACTIVE, if the RRCRelease includes a suspendConfig and if the suspend-Config includes a SDT-Config.

The terminal releases idc_AssistanceConfig_1 (and/or idc_AssistanceConfig_2 and/or idc_AssistanceConfig_3) in a third cell after entering into RRC_INACTIVE and before transmission of a RRCResume, if the RRCRelease includes a suspendConfig and if the suspendConfig does not include a SDT-Config.

Figure 3:
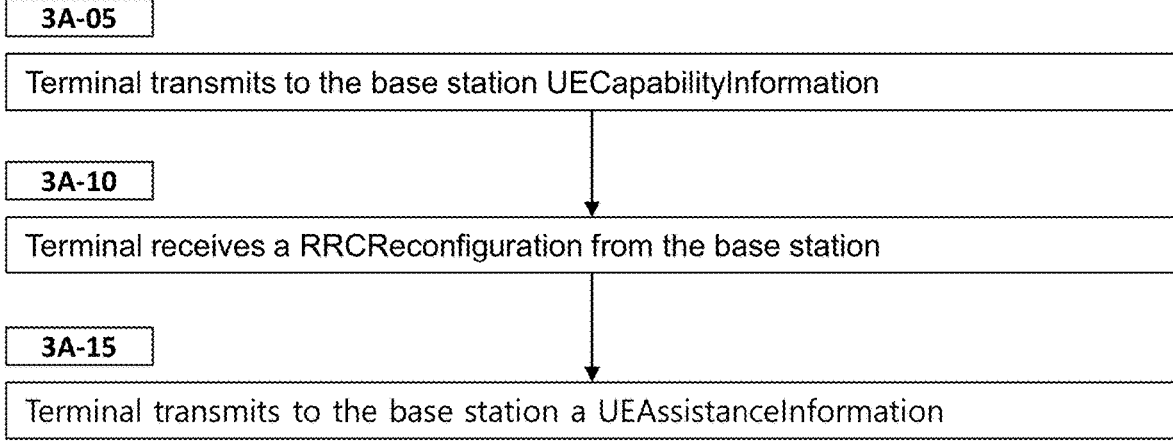
FIG. 3 is a flow diagram illustrating an operation of a terminal.

FIG. 3 is a flow diagram illustrating an operation of a terminal.

In 3A-05, terminal transmits to the base station UECapabilityInformation. The UECapabilityInformationincludes a UE-NR-Capability. The UE-NR-Capability includes a inDeviceCoexInd.

In 3A-10, terminal receives a RRCReconfiguration from the base station. The RRCReconfiguration includes zero or one idc_AssistanceConfig_1 and zero or one idc_AssistanceConfig_2 and zero or one idc_AssistanceConfig_3.

In 3A-15, terminal transmits to the base station a UEAssistanceInformation. The UEAssistanceInformation includes a first IDC assistance information and/or a second IDC assistance information and/or a third IDC assistance information.

Figure 4A:
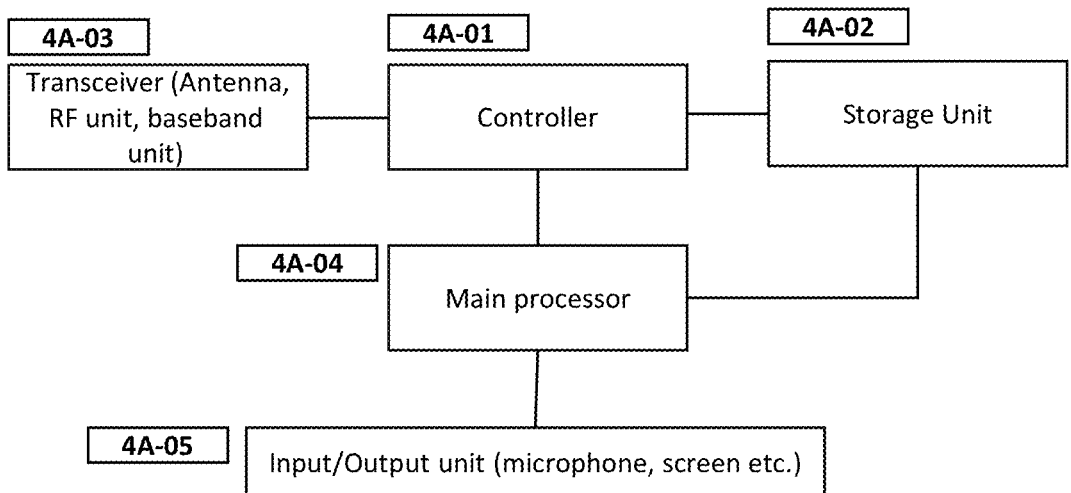
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 controls the overall operations of the UE in terms of mobile communication. For example, the controller 4A-01 receives/transmits signals through the transceiver 4A-03. In addition, the controller 4A-01 records and reads data in the storage unit 4A-02. To this end, the controller 4A-01 includes at least one processor. For example, the controller 4A-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4A-02 stores data for operation of the UE, such as a basic program, an application program, and configuration information. The storage unit 4A-02 provides stored data at a request of the controller 4A-01.

The transceiver 4A-03 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4A-04 controls the overall operations other than mobile operation. The main processor 4A-04 process user input received from I/O unit 4A-05, stores data in the storage unit 4A-02, controls the controller 4A-01 for required mobile communication operations and forward user data to I/O unit 4A-05.

I/O unit 4A-05 consists of equipment for inputting user data and for outputting user data such as a microphone and a screen. I/O unit 4A-05 performs inputting and outputting user data based on the main processor's instruction.

Figure 4B:
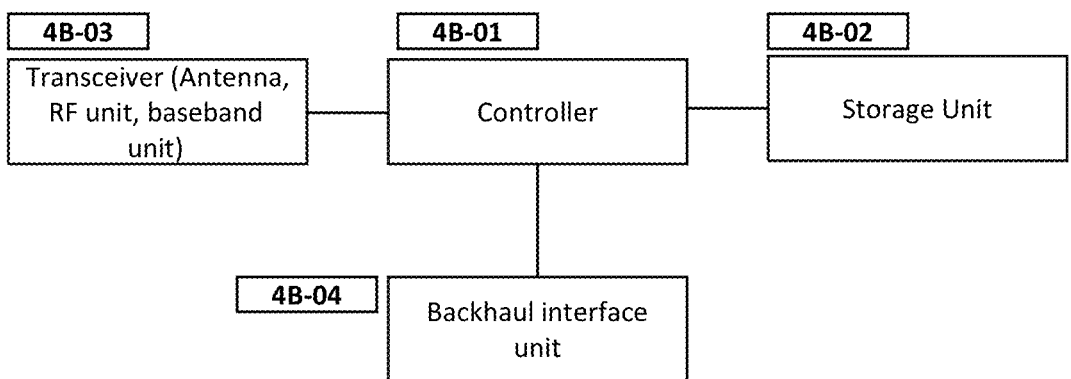
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 controls the overall operations of the main base station. For example, the controller 4B-01 receives/transmits signals through the transceiver 4B-03, or through the backhaul interface unit 4B-04. In addition, the controller 4B-01 records and reads data in the storage unit 4B-02. To this end, the controller 4B-01 may include at least one processor. The controller controls transceiver, storage unit and backhaul interface such that base station operation illustrated in FIG. 2 are performed.

The storage unit 4B-02 stores data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 provides stored data at a request of the controller 4B-01.

The transceiver 4B-03 consists of a RF processor, a baseband processor and one or more antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4B-04 provides an interface for communicating with other nodes inside the network. The backhaul interface unit 4B-04 converts a bit string transmitted from the base station to another node, for example, another base station or a core network, into a physical signal, and converts a physical signal received from the other node into a bit string.

What is claimed is:

1. A method by a terminal in a wireless communication system, the method comprising:

receiving by the terminal from a base station a first Radio Resource Control (RRC) message, wherein the first RRC message comprises two parameters for in-device coexistence (IDC) assistance configuration, including:

a first parameter related to frequency-specific IDC assistance configuration, and a second parameter related to time-specific IDC assistance configuration; and transmitting by the terminal to the base station a second RRC message in case that in-device coexistence problem is detected, wherein the second RRC message comprises:

a parameter indicating a list of specific combinations, each of which consists of two or more bandwidth portions related to inter-modulation distortion, a parameter indicating victim system, and a parameter related to slot pattern.

2. A terminal in a wireless communication system, the terminal comprising:

a transceiver configured to transmit and receive a signal; and a controller configured to control the transceiver to:

receive from a base station a first Radio Resource Control (RRC) message, wherein the first RRC message comprises two parameters for in-device coexistence (IDC) assistance configuration, including:

a first parameter related to frequency-specific IDC assistance configuration, and a second parameter related to time-specific IDC assistance configuration, and transmit to the base station a second RRC message in case that in-device coexistence problem is detected, wherein the second RRC message comprises:

a parameter indicating a list of specific combinations, each of which consists of two or more bandwidth portions related to inter-modulation distortion, a parameter indicating victim system, and a parameter related to slot pattern.

3. A method by a base station in a wireless communication system, the method comprising:

transmitting by the base station to a terminal a first Radio Resource Control (RRC) message, wherein the first RRC message comprises two parameters for in-device coexistence (IDC) assistance configuration, including:

a first parameter related to frequency-specific IDC assistance configuration, and a second parameter related to time-specific IDC assistance configuration; and receiving by the base station from the terminal a second RRC message, wherein the second RRC message comprises:

a parameter indicating a list of specific combinations, each of which consists of two or more bandwidth portions related to inter-modulation distortion, a parameter indicating victim system, and a parameter related to slot pattern.

* * * * *